US011139632B2

United States Patent
Kajiwara et al.

(10) Patent No.: US 11,139,632 B2
(45) Date of Patent: Oct. 5, 2021

(54) OPTICAL MODULE AND LIGHT OUTPUT DEVICE

(71) Applicant: FURUKAWA ELECTRIC CO., LTD., Tokyo (JP)

(72) Inventors: Koji Kajiwara, Tokyo (JP); Keishi Takaki, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 589 days.

(21) Appl. No.: 16/054,654

(22) Filed: Aug. 3, 2018

(65) Prior Publication Data

US 2018/0375279 A1 Dec. 27, 2018

Related U.S. Application Data

(63) Continuation of application No. PCT/JP2017/004142, filed on Feb. 6, 2017.

(30) Foreign Application Priority Data

Feb. 4, 2016 (JP) .............................. JP2016-020282

(51) Int. Cl.
*G02B 6/255* (2006.01)
*G02B 6/26* (2006.01)
(Continued)

(52) U.S. Cl.
CPC ........ *H01S 3/06708* (2013.01); *G02B 6/0006* (2013.01); *G02B 6/02* (2013.01);
(Continued)

(58) Field of Classification Search
None
See application file for complete search history.

(56) References Cited

U.S. PATENT DOCUMENTS 5,778,129 A 7/1998 Shukunami et al.
6,428,217 B1 8/2002 Giltner
(Continued)

FOREIGN PATENT DOCUMENTS

JP 9-197131 A 7/1997
JP 2004-101950 A 4/2004
(Continued)

OTHER PUBLICATIONS

Office Action dated Jun. 30, 2020 in corresponding Chinese Patent Application No. 201780009203.9, with English translation.
(Continued)

*Primary Examiner* — Eric L Bolda
(74) *Attorney, Agent, or Firm* — Birch, Stewart, Kolasch & Birch, LLP

(57) ABSTRACT

An optical module comprising a first optical fiber corresponding to an incidence side for laser light a second optical fiber corresponding to an emission side for the laser light; and a connection protecting portion that is provided and located so as to cover a connection site for optically connecting the first optical fiber and the second optical fiber, wherein the second optical fiber has a larger core diameter than the first optical fiber, the connection site is a site where a core portion of the first optical fiber and a core portion of the second optical fiber are connected to each other in a discontinuous shape, and the connection protecting portion is formed of a thermally conductive protective material and/or a photorefractive protective material includes refractive index that is equal to or higher than that of a clad portion of the first optical fiber.

8 Claims, 7 Drawing Sheets

(51) Int. Cl.
*G02B 6/02* (2006.01)
*H01S 3/067* (2006.01)
*F21V 8/00* (2006.01)

(52) U.S. Cl.
CPC ............ *G02B 6/255* (2013.01); *G02B 6/262* (2013.01); *H01S 3/0675* (2013.01); *H01S 3/06745* (2013.01)

(56) References Cited

U.S. PATENT DOCUMENTS

| | | | | |
|---|---|---|---|---|
| 9,407,053 | B2* | 8/2016 | Rowen | H01S 3/0064 |
| 2003/0053775 | A1* | 3/2003 | Chen | G02B 6/262 |
| | | | | 385/123 |
| 2009/0074362 | A1 | 3/2009 | Oba | |
| 2009/0080835 | A1* | 3/2009 | Frith | G02B 6/14 |
| | | | | 385/50 |
| 2012/0070115 | A1* | 3/2012 | Langseth | G02B 6/14 |
| | | | | 385/29 |

FOREIGN PATENT DOCUMENTS

| | | |
|---|---|---|
| JP | 2008-310277 A | 12/2008 |
| JP | 2011-99926 A | 5/2011 |
| JP | 2011-211220 A | 10/2011 |
| JP | 2014-29548 A | 2/2014 |
| JP | 2015-175958 A | 10/2015 |

OTHER PUBLICATIONS

International Preliminary Report on Patentability and English translation of the Written Opinion of the International Searching Authority (Forms PCT/IB/373 and PCT/ISA/237) for International Application No. PCT/JP2017/004142, dated Aug. 7, 2018.
International Search Report issued in PCT/JP2017/004142 (PCT/ISA/210), dated Apr. 25, 2017.
Written Opinion of the International Searching Authority issued in PCT/JP2017/004142 (PCT/ISA/237), dated Apr. 25, 2017.
Chinese Office Action for Chinese Application No. 201780009203.9, dated Jan. 15, 2021, with English translation.
Japanese Office Action for Japanese Application No. 2017-565679, dated Dec. 22, 2020, with English translation.
Office Action dated Jun. 30, 2020 in corresponding Japanese Patent Application No. 2017-565679, with English translation.
Office Action dated Nov. 8, 2019 in corresponding Chinese Patent Application No. 201780009203.9, with English translation.

* cited by examiner

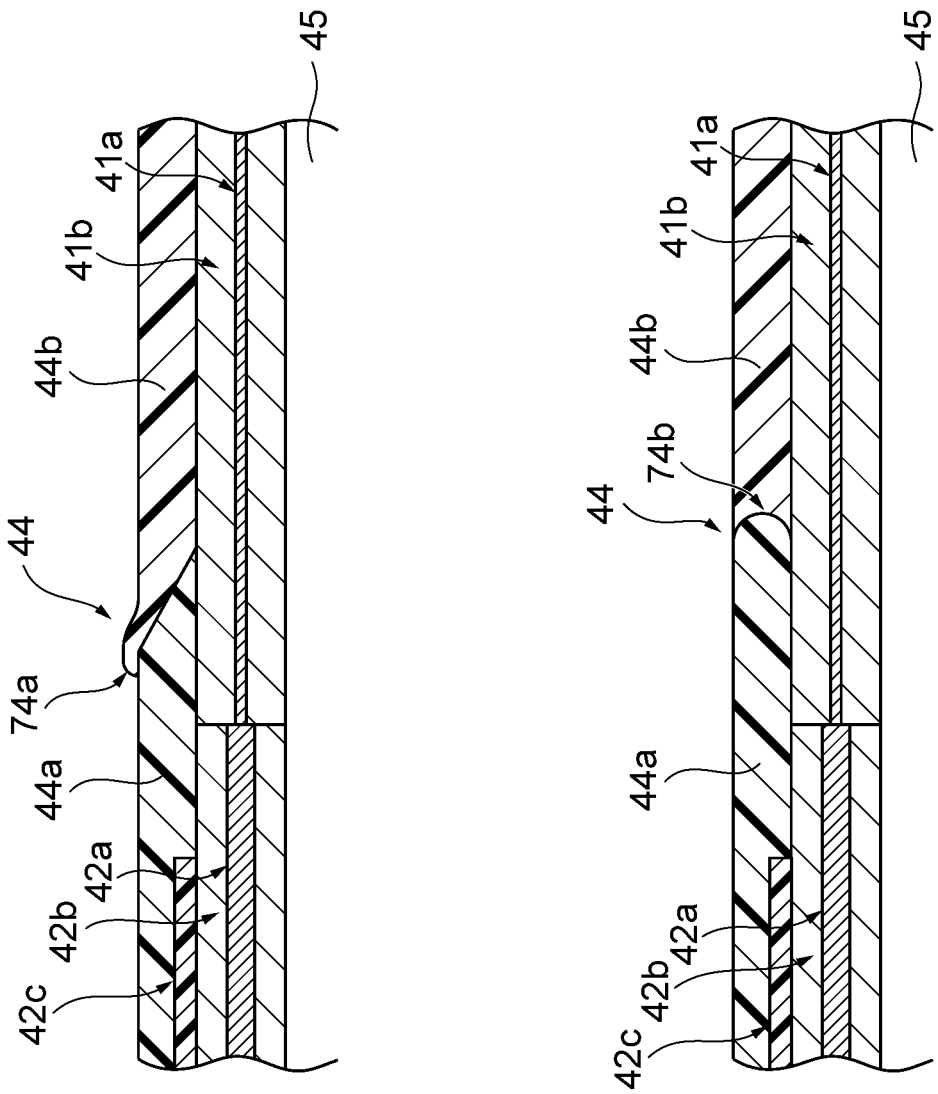

OPTICAL MODULE AND LIGHT OUTPUT DEVICE

CROSS REFERENCE TO RELATED APPLICATIONS

This is a continuation application of International Patent Application No. PCT/JP2017/004142 filed Feb. 6, 2017, which claims the benefit of Japanese Patent Application No. 2016-020282, filed Feb. 4, 2016, the full contents of both of which are hereby incorporated by reference in their entirety.

BACKGROUND

Technical Field

The present disclosure relates to an optical module for connecting optical fibers having different core diameters and a light output device configured to include the optical module.

Background

Conventionally, for the purpose of propagation of light from a light source, after covers are removed to expose clads at end portions of optical fibers having different diameters, the end faces of the optical fibers are made to face each other to adjust the positions of the cores of the optical fibers and then heated to be fused and spliced to each other (see JP2011-099926A, for example).

Meanwhile, propagating light to a position distant from a light source is required. When light is caused to propagate from the light source to a position far away from the light source, it is necessary to increase the core diameter of an optical fiber in order to suppress stimulated Raman scattering (SRS). However, when optical fibers having different core diameters are fused and spliced to each other, there is a risk that the optical fibers may be damaged due to leakage of light in the vicinity of a fused and spliced portion.

Therefore, in order to reduce a fusion loss as described above, a connection method based on a space coupling system such as FFC (Fiber to Fiber Coupling unit), or a method of fusing and splicing core portions in a tapered shape so that the core portions form a continuous shape is conceivable. However, these methods cause a problem in that the number of working steps is large and the manufacturing cost is increased.

Therefore, the present disclosure is related to the connection between optical fibers having different core diameters and to providing an optical module and a light output device that are capable of reducing the number of working steps and reduction of a manufacturing cost compatible with each other.

SUMMARY

According to one aspect of the present disclosure, an optical module comprises: a first optical fiber corresponding to an incidence side for laser light; a second optical fiber corresponding to an emission side for the laser light; and a connection protecting portion that is provided and located so as to cover a connection site for optically connecting the first optical fiber and the second optical fiber, wherein the second optical fiber has a larger core diameter than the first optical fiber, the connection site is a site where a core portion of the first optical fiber and a core portion of the second optical fiber are connected to each other in a discontinuous shape, and the connection protecting portion includes a thermally conductive protective material and/or a photorefractive protective material having a refractive index that is equal to or higher than that of a clad portion of the first optical fiber.

Since the first optical fiber having a relatively small core diameter is provided on the incidence side for the laser light and the second optical fiber having a relatively large core diameter is provided on the emission side for the laser light, the laser light is enabled to propagate in a forward direction with no leakage even through the use of a connection site where the core portions are simply connected to each other in a discontinuous shape.

However, for some reason, return of laser light may occur so that return light propagating in a reverse direction may reach the connection site. At this time, the return light leaks out to the clad portion via the connection site due to the magnitude correlation in core diameter. As a result, when the leakage light in the reverse direction is released to the outside of the optical fiber, the temperature may increase in the vicinity of the connection site, so that the optical fiber may be deteriorated or damaged. Furthermore, there is also a concern that the leakage light in the reverse direction may propagate through the clad portion, thereby affecting optical components, electronic components, etc. arranged on the incidence side.

Therefore, the connection site is enclosed and covered by the thermally conductive protective material, whereby it is possible to suppress increase of the temperature in the vicinity of the connection site while gradually releasing the leakage light in the reverse direction to the outside of the clad portion. In combination with or independently of this, the connection site is covered with a photorefractive protective material having a relatively higher refractive index than the clad portion of the first optical fiber, whereby the leakage light in the reverse direction can be promptly released to the outside of the clad portion.

By combining the above-described configurations, it is possible to provide an optical module capable of making reduction in the number of working steps and reduction of the manufacturing cost compatible with each other with respect to the connection between optical fibers having different core diameters.

Furthermore, it is preferable that the connection protecting portion is provided on an outer peripheral surface of the clad portion, and includes a first protective material formed of the thermally conductive protective material, and a second protective material formed of the photorefractive protective material that are provided in this order from the emission side for the laser light to the incidence side for the laser light. As a result, it is possible to preferentially suppress increase of the temperature in the vicinity of the connection site, and it is also possible to promptly release a remaining leakage light in the reverse direction to the outside of the clad portion.

Furthermore, it is preferable that the connection protecting portion is provided on an outer peripheral surface of the clad portion, and includes a first protective material formed of the thermally conductive protective material, a second protective material formed of the photorefractive protective material, and a third protective material formed of the thermally conductive protective material that are provided in this order from the emission side for the laser light to the incidence side for the laser light. As a result, it is possible to preferentially suppress increase of the temperature in the vicinity of the connection site, and promptly release a remaining leakage light in the reverse direction to the outside of the clad portion. When the leakage light in the reverse direction still remains, increase of the temperature in the vicinity of the second protective material can be suppressed while gradually releasing this leakage light to the outside of the clad portion.

Furthermore, it is preferable that an output unit for condensing the emitted laser light and outputting the condensed laser light to the outside is optically connected to a side of the second optical fiber. With respect to the output unit for condensing the laser light and outputting the condensed laser light to the outside, the light amount of the return light tends to change according to the condensed state of the laser light. Therefore, when the light amount of the return light unexpectedly increases, the effect of suppressing increase of the temperature in the vicinity of the connection site while gradually releasing the leakage light in the reverse direction to the outside of the clad portion appears conspicuously. In combination with or independently of this, the connection site is covered by the photorefractive protective material having a relatively higher refractive index than the clad portion of the first optical fiber, whereby the effect of enabling prompt release of the leakage light in the reverse direction to the outside of the clad portion appears conspicuously.

A light output device according to the present disclosure comprises any optical module described above, a light source unit for making laser light incident on the optical module, and an output unit for outputting the laser light emitted from the optical module to the outside.

As described above, according to the present disclosure, with respect to the connection between optical fibers having different core diameters, an optical module and a light output device that are capable of making reduction of the number of working steps and reduction of the manufacturing cost compatible with each other can be provided.

BRIEF DESCRIPTION OF THE DRAWINGS

FIGS. 7A and 7B are cross-sectional views showing connection protecting portions of an optical module according to another embodiment.

DETAILED DESCRIPTION

An optical module and a light output device according to embodiments of the present disclosure will be described with reference to the drawings.

1. First Embodiment

First, a schematic configuration of a light output device according to a first embodiment will be described with reference to FIG. 1.

[1-1. Schematic Configuration of Light Output Device]

Figure 1:
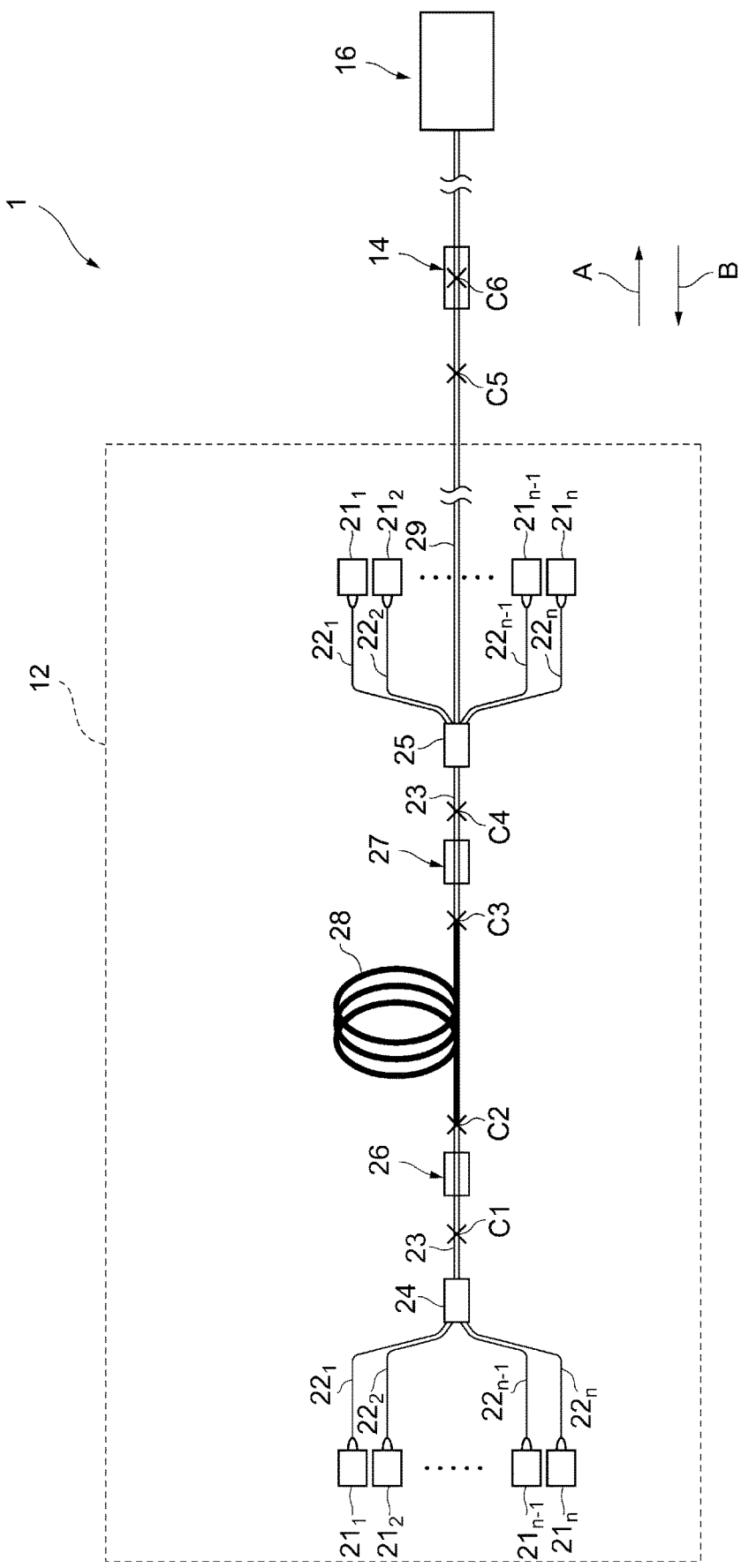
FIG. 1 is a plan view showing a light output device according to a first embodiment.

As shown in FIG. 1, a light output device 1 according to the first embodiment includes a light source unit 12 for emitting laser light, an optical module 14 for optically connecting the light source unit 12 and an output unit 16, and the optical unit 16 for outputting laser light emitted from the optical module 14.

The light source unit 12 includes semiconductor laser elements $21_1$ to $21_n$ as excitation light sources, multimode optical fibers $22_1$ to $22_n$ for guiding excitation light output from the semiconductor laser elements $21_1$ to $21_n$, tapered fiber bundles (TFB) 24 and 25 for combining the excitation light guided by the multimode optical fibers $22_1$ to $22_n$ and outputting the combined excitation light from double clad optical fibers 23, double clad type optical fiber gratings 26 and 27, which are connected to the respective double clad optical fibers 23 at connection points C1 and C4 respectively, a double-clad type optical fiber 28 added with a rare earth element connected to the optical fiber gratings 26 and 27 at connection points C2 and C3, and an output optical fiber 29 connected to TFB 24.

The wavelength of the excitation light output from the semiconductor laser elements $21_1$ to $21_n$ is around 915 nm. The optical fiber grating 26 has a center wavelength of 1070 nm, the reflectance of the optical fiber grating 26 in a wavelength band which contains the center wavelength and has a width of about 4 nm around the center wavelength is equal to about 100%, and the majority of light having a wavelength of 915 nm is transmitted. The optical fiber grating 27 has a center wavelength of 1070 nm, the reflectance of the optical fiber grating 27 at the center wavelength ranges from about 10 to 30%, a full width at half maximum of a reflection wavelength band is equal to about 1 nm, and the majority of light having a wavelength of 915 nm is transmitted. Therefore, the optical fiber gratings 26 and 27 constitute an optical resonator for light having a wavelength of 1070 nm. Furthermore, the optical fiber 28 added with the rare earth element is an amplifying optical fiber added with ytterbium (Yb) ions as an amplifying material in a core portion.

Each of the above-mentioned optical fibers is a quartz glass type optical fiber, the double clad optical fiber 23 and the optical fiber grating 26 are fused and spliced to each other at a connection point C1, the optical fiber grating 26 and the optical fiber 28 added with the rare earth element are fused and spliced to each other at a connection point C2, the optical fiber 28 added with the rare earth element and the optical fiber grating 27 are fused and spliced to each other at a connection point C3, and the optical fiber grating 27 and the double clad optical fiber 23 are fused and spliced at a connection point C4. The output optical fiber 29 is fused and spliced to the optical module 14 at a connection point C5.

[1-2. Configuration of Optical Module]

Figure 2A:
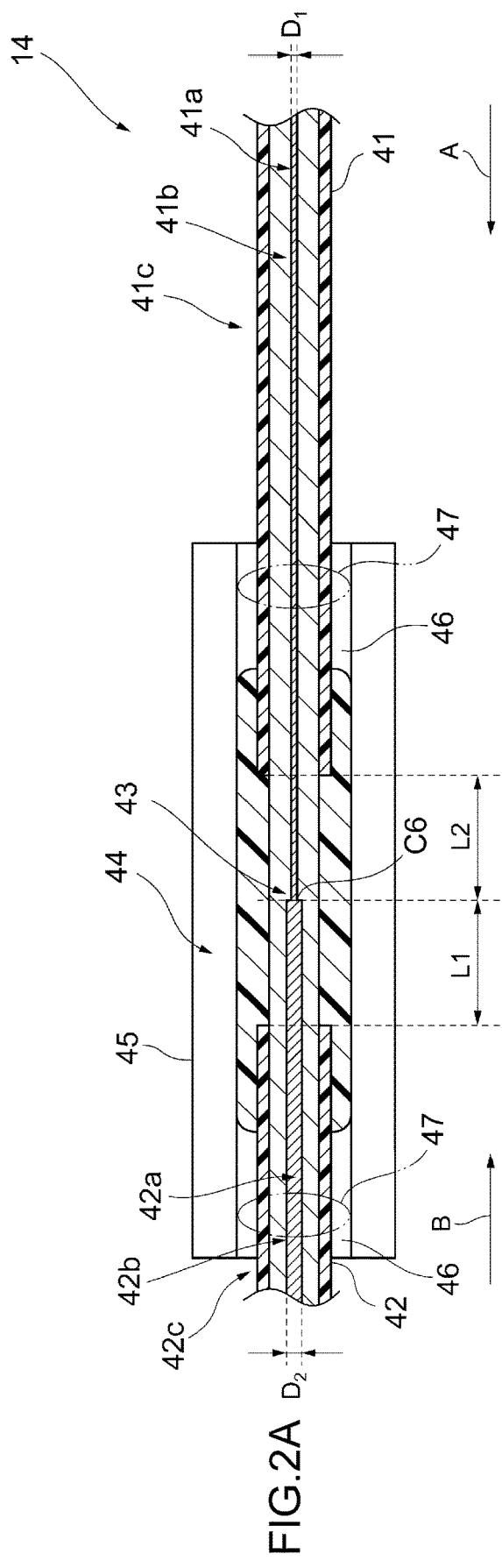
FIG. 2A is a cross-sectional view showing a configuration of an optical module shown in FIG. 1.
Figure 2B:
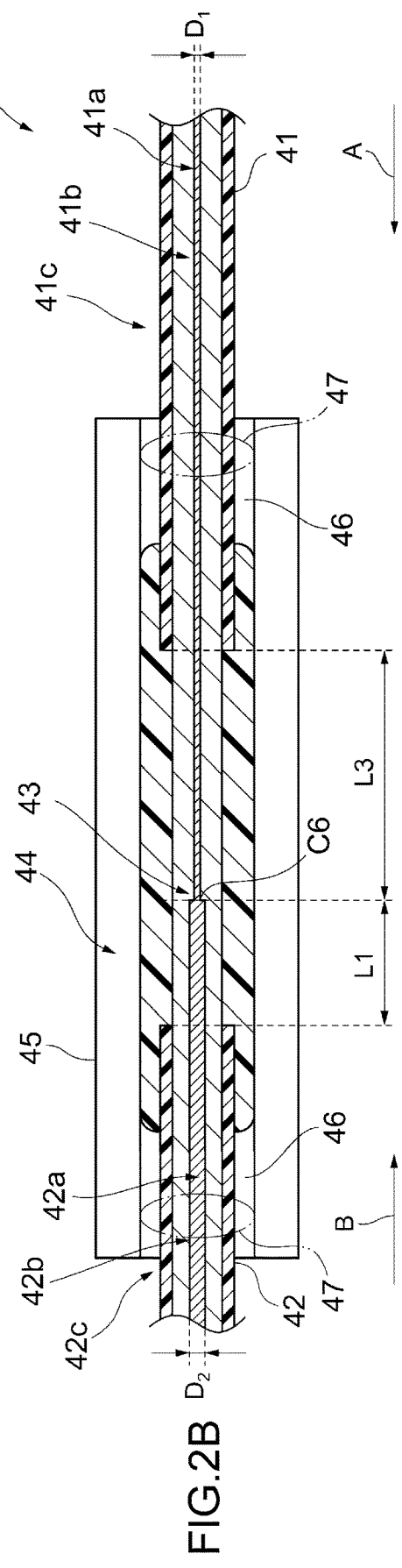
FIG. 2B is a cross-sectional view showing a variant of a connection protecting portion shown in FIG. 2A.

Next, a configuration of the optical module 14 will be described with reference to FIGS. 2A and 2B. As shown in FIGS. 2A and 2B, the optical module 14 includes an incidence-side optical fiber (first optical fiber) 41 corresponding to an incidence side for laser light (arrow A side), an emission-side optical fiber (second optical fiber) 42 corresponding to an emission side for laser light (arrow B side), a connection protecting portion 44 that is provided and located so as to cover a connection site 43 for optically connecting the incidence-side optical fiber 41 and the emission-side optical fiber 42 to each other, and a base material 45 on which the incidence-side optical fiber 41 and the emission-side optical fiber 42 are placed.

The incidence-side optical fiber 41 has a core portion 41a, a clad portion 41b provided on the outer periphery of the core portion 41a, and a cover portion 41c provided on the outer periphery of the clad portion 41b and formed of resin or the like having a low refractive index. For example, the diameter of the core portion 41a (hereinafter referred to as "core diameter D1") is equal to 100 µm, the diameter of the clad portion 41b (clad diameter) is equal to 400 µm, and the diameter of the cover portion 41c (cover diameter) is equal to 900 µm.

The emission-side optical fiber 42 has a core portion 42a, a clad portion 42b provided on the outer periphery of the core portion 42a, and a cover portion 42c provided on the outer periphery of the clad portion 42b and formed of resin or the like having a low refractive index. For example, the diameter of the core portion 42a (hereinafter referred to as "core diameter D2") is equal to 200 µm, and is larger than the core diameter D1. The diameter of the clad portion 42b (clad diameter) is equal to 400 µm, and is equal to the diameter of the clad portion 41b. The diameter of the cover portion 41c (cover diameter) is equal to 900 µm.

The incidence-side optical fiber 41 and the emission-side optical fiber 42 are fused and spliced to each other at a connection point C6 while the cover portion 41c and the cover portion 42c are removed around a connection site 43. In the example shown in FIG. 2A, the length L1 of the removed cover in the emission-side optical fiber 42 is substantially equal to the length L2 of the removed cover in the incidence-side optical fiber 41 (L1≈L2). In the example shown in FIG. 2B, the length L1 in the emission-side optical fiber 42 is smaller than the length L3 of the removed cover in the incidence-side optical fiber 41 (L1<L3).

At the connection site 43 containing the connection point C6, the core portion 41a of the incidence-side optical fiber 41 and the core portion 42a of the emission-side optical fiber 42 are connected to each other in a discontinuous shape. In this case, the connection site 43 has a stepped shape in which the cross-sectional area of the core along an axial direction changes stepwise at the connection point C6.

The connection protecting portion 44 is provided and located on the outer peripheral surfaces of the clad portion 41b and the clad portion 42b so as to straddle the connection point C6. The connection protecting portion 44 is formed of a thermally conductive protective material containing a silicone-based thermally conductive compound. A material having a higher thermal conductivity than the clad portion 41b or the clad portion 42b may be used as the thermally conductive protective material. Specifically, it is preferable to use T644 manufactured by US Comerix Corporation containing boron nitride as a filler. Other materials may be used as the thermally conductive protective material insofar as the materials gradually release light propagating through the clad portion 41b or the clad portion 42b to the outside of the clad portion 41b or the clad portion 42b, or scatter light leaking from the clad portion 41b or the clad portion 42b to the thermally conductive protective material, so that the light is not absorbed at once. In addition, it is preferable for the thermally conductive protective material that the transmittance per mm in thickness when laser light is applied substantially vertically to the thermally conductive protective material ranges from not less than 0.5% to not more than 10%, particularly from not less than 1% to not more than 10%. The transmittance per mm in thickness when laser light is applied substantially vertically may be determined by measuring the ratio between laser power in the case of no thermally conductive protective material and laser power transmitted through the thermally conductive protective material, and calculating the transmittance concerned from the thickness of the thermally conductive protective material used for the measurement.

The base material 45 is a substantially rectangular parallelepiped member formed of metal such as aluminum having high thermal conductivity, and has a length that enables the overall connection protecting portion 44 to be covered by the base material 45. A groove 46 is formed in the base material 45, and the connection protecting portion 44 and the incidence-side optical fiber 41 and the emission-side optical fiber 42 in the vicinity of the connection protecting portion 44 are accommodated in this groove 46. The accommodated incidence-side optical fiber 41 and emission-side optical fiber 42 are fixed by fixing members 47 formed of silicone or the like in the vicinity of both end portions of the base material 45.

[1-3. Method of Manufacturing Optical Module]

Next, a method of manufacturing the optical module 14 will be described with reference to FIG. 2A.

First, the incidence-side optical fiber 41 to be connected to a downstream side of the light source unit 12 and the emission-side optical fiber 42 to be connected to an upstream side of the output unit 16 are prepared. A cover of a predetermined length (a length obtained by adding a margin to L1) out of the cover portion 42c is removed from the connection point C6 in a forward direction of laser light (a direction of arrow A), and a cover of a predetermined length (a length obtained by adding a margin to L2) out of the cover portion 41c is removed from the connection point C6 in a reverse direction of laser light (a return direction; a direction of arrow B). Then, the incidence-side optical fiber 41 and the emission-side optical fiber 42 are fused and spliced to each other by using a fusion splicer (not shown). It should be noted that this fusion splicer does not have a function of fusing and splicing the core portion 41a and the core portion 42a in a tapered shape so that the core portion 41a and the core portion 42a form a continuous shape, but has a general fusing and splicing function.

The connection protecting portion 44 covering the connection site 43 is provided by coating a thermally conductive protective material in the vicinity of the connection point C6 on the exposed outer peripheral surfaces of the clad portion 41b and clad portion 42b. Finally, the incidence-side optical fiber 41 and the emission-side optical fiber 42 are accommodated in the groove 46 of the base material 45, and the incidence-side optical fiber 41 and the emission-side optical fiber 42 are fixed in the vicinity of both the end portions of the base material 45 by a fixing member 47 formed of silicone or the like, thereby completing the optical module 14.

[1-4. Operation of Light Output Device]

Figure 3:
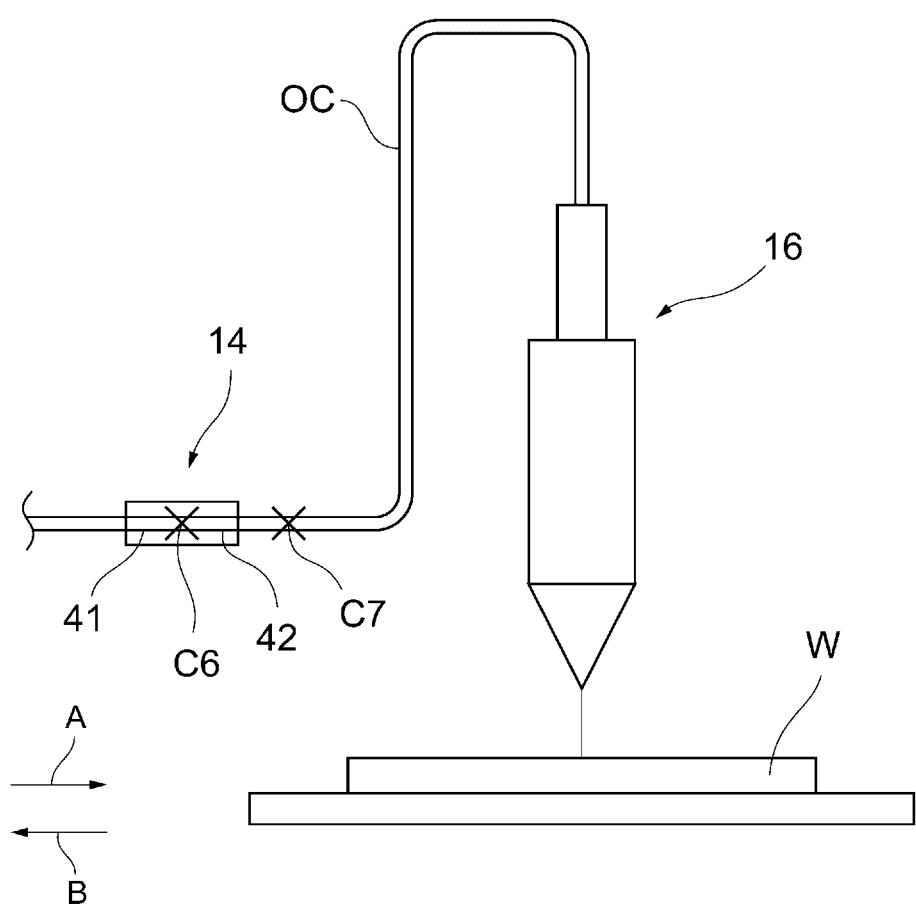
FIG. 3 is a plan view showing an output unit to be connected to the optical module shown in FIG. 1.

Next, the operation of the light output device 1 will be described with reference to FIGS. 1 to 3. FIG. 3 is a schematic front view showing an embodiment of the output unit 16.

As shown in FIG. 1, when the semiconductor laser elements $21_1$ to $21_n$ output excitation light having wavelengths around 915 nm, the multimode optical fibers $22_1$ to $22_n$ guide the respective excitation light and TFBs 24 and 25 combine the respective guided excitation light, and output the combined excitation light to the double clad optical fibers 23. The double clad optical fibers 23 propagate the combined excitation light in a multimode. Thereafter, the optical fiber gratings 26 and 27 transmit the combined excitation light propagating through the double clad optical fibers 23, and cause the composite excitation light to reach the optical fiber 28 added with the rare earth element.

The excitation light that has reached the optical fiber 28 added with the rare-earth element optically excites Yb ions added to the core portion of the optical fiber 28 added with the rare earth element while propagating in an inner clad of the optical fiber 28 added with the rare earth element in a multimode, thereby causing emission of fluorescence having a wavelength band containing a wavelength of 1070 nm. This fluorescence is amplified by a stimulated emission action of Yb ions while reciprocating in a single mode inside an optical resonator constituted by the optical fiber gratings 26 and 27, so that laser oscillation occurs at an oscillation wavelength of 1070 nm.

In this way, the light source unit 12 outputs the laser light from the output optical fiber 29. The laser light from the output optical fiber 29 passes through the connection point C5, and is incident on the optical module 14.

As shown in FIG. 2, in the optical module 14, the incidence-side optical fiber 41 having a relatively small core diameter D1 is provided on the incidence side for the laser light, and the emission-side optical fiber 42 having a relatively large core diameter D2 is provided on the emission side for the laser light. It is possible to make the laser light propagate in the forward direction (the direction of the arrow A) without leakage of the laser light even under a state that the core portion 41a and the core portion 42a are connected to each other in a discontinuous shape. In this way, the laser light from the emission-side optical fiber 42 is passed through a connection point C7, and is emitted to the output unit 16.

As shown in FIG. 3, the output unit 16 is connected to the emission-side optical fiber 42 of the optical module 14 via a connection cable OC. Here, the output unit 16 is an optical device for cutting a workpiece W made of metal containing copper or the like by irradiating the workpiece W with laser light and ejecting assist gas.

A converging optical system for condensing laser light to obtain a laser beam is mounted in this type of optical device. At this time, the light amount of the above-mentioned return light tends to change according to the condensed state of the laser beam on the workpiece W. Specifically, when the laser beam is condensed at a correct position, the return light is slight as if no return light is generated. On the other hand, when the condensing position of the laser beam is shifted, return light occurs to the extent that it is not negligible.

In this case, this return light may propagate in the reverse direction (the direction of the arrow B) in the core portion 42a of the emission-side optical fiber 42 and reach the connection site 43. At this time, the return light leaks to the clad portion 41b via the connection site 43 due to the magnitude correlation (D1<D2) between the core diameters D1 and D2.

However, with respect to the optical module 14 according to the first embodiment, the connection site 43 is enclosed and covered by the connection protecting portion 44 formed of a thermally conductive protective material, whereby increase of the temperature in the vicinity of the connection site 43 can be suppressed while gradually releasing leakage light in the reverse direction (the direction of the arrow B) to the outside of the clad portion 41b.

[1-5. Confirmation of Effect]

Next, measurement results of highest temperature, etc. at the connection site 43 when return of laser light occurs will be described with reference to FIGS. 2A and 2B.

In the measurement of the connection site 43, in order to reproduce the return light of laser light, laser light of 100 W was incident from the emission-side optical fiber 42, and the temperature of the connection site 43 and a clad removal rate representing a rate at which light propagating through the clad portions 41b and 42b is released to the outside were measured.

First, when laser light of 100 W was incident from the emission-side optical fiber 42 without covering the connection site 43 with the connection protecting portion 44, it was conformed that about 35% of incident laser light was coupled to the core portion 41a of the incidence-side optical fiber 41 as a core mode while about 60% of the incident light was coupled to the clad portion 41b as a clad mode. The remaining laser light of about 5% is laser light leaking into the air and into the air through the cover portion 41c or the cover portion 42c.

Therefore, in order to quantitatively confirm the effect of releasing the laser light propagating in the clad portions 41b and 42b to the outside, the temperature of the connection site 43 and the clad removal rate were measured. This "clad removal rate" is the rate of power that could be leaked by covering the connection site 43 with the connection protecting portion 44 to power of 60% coupled as the clad mode. That is, for the power of 60% coupled as the clad mode, a state where no power is released corresponds to 0%, and a state where all the power is released corresponds to 100%.

The refractive index of each of the clad portions 41b and 42b is equal to 1.468, and the refractive index of each of the cover portions 41c and 42c is equal to 1.376. In addition, with respect to the thermally conductive protective material (T644) constituting the connection protecting portion 44, the refractive index of boron nitride as a filler is equal to 2.14.

As shown in FIG. 2A, when the lengths of the covers to be removed in the cover portions 41c and 42c were set to L1 (about 1 cm) and L2 (about 1 cm) respectively and the connection site 43 containing the exposed clad portions 41b and 42b was coated with the thermally conductive protective material, the highest temperature of the connection site 43 was measured to be about 35° C. and the clad removal rate was measured to be about 25%.

Next, as shown in FIG. 2B, after the incidence-side optical fiber 41 and the emission-side optical fiber 42 were fused and spliced to each other, the cover of the cover portion 41c was further removed from the emission side for the laser light to the incidence side for the laser light, and the length of the removed cover was set to L3 (for example, the cover was further removed from L2 by about 1 cm to set the length of L3 to about 2 cm).

When the connection site 43 containing the exposed clad portion 41b and clad portion 42b was coated with the thermally conductive protective material, the highest temperature of the connection site 43 was measured to be about 30° C., and the clad removal rate was measured to be about 45%.

Furthermore, when the length L3 shown in FIG. 2B was set to about 8 cm and the connection site 43 containing the exposed clad portion 41b and clad portion 42b was coated with the thermally conductive protective material, the highest temperature of the connection site 43 was measured to be about 30° C., and the clad removal rate was measured to be about 73%.

Furthermore, when the length of L3 was set to about 8 cm and the radius R at a bending position when the incidence-side optical fiber 41 was bent was set to about 8 cm, the highest temperature of the connection site 43 was measured to be about 30° C., and the clad removal rate was measured to be about 79%.

Therefore, in order to reduce the highest temperature and increase the clad removal rate in the vicinity of the connection site 43, the cover of the length L1 in the cover portion 42c is removed while the cover of the length L2 in the cover portion 41c is removed, the incidence-side optical fiber 41 and the emission-side optical fiber 42 are fused and spliced to each other, and then the cover of the cover portion 41c is further removed. Then, it is preferable that the length of the removed cover is set to L3 (from 2 cm to 8 cm) and the connection site 43 containing the exposed clad portion 41b and clad portion 42b is coated with the thermally conductive protective material.

2. Second Embodiment

Next, an optical module according to a second embodiment will be described with reference to FIG. 4. The second embodiment relates to an improvement of the configuration of the optical module 14 according to the first embodiment, and the configurations of the other parts are similar to those of the first embodiment. Therefore, with respect to the same configurations, etc. as those of the optical module 14 according to the first embodiment, descriptions of these configurations, etc. are omitted, and similar components to those of the optical module 14 according to the first embodiment will be described while represented by the same reference signs.

[2-1. Configuration of Optical Module]

Figure 4:
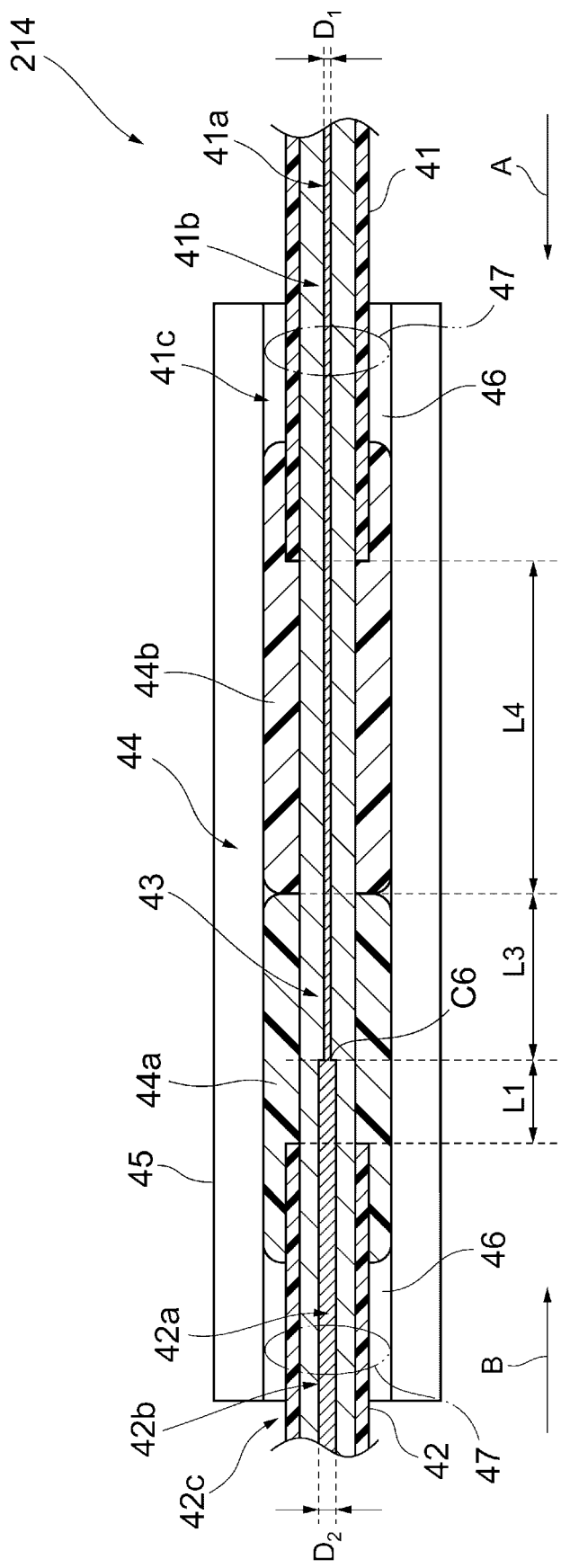
FIG. 4 is a cross-sectional view showing a configuration of an optical module according to a second embodiment.

As shown in FIG. 4, an optical module 214 includes an incidence-side optical fiber (first optical fiber) 41 corresponding to an incidence side for laser light, an emission-side optical fiber (second optical fiber) 42 corresponding to an emission side for laser light, a connection protecting portion 44 that is provided and located so as to cover a connection site 43 for optically connecting the incidence-side optical fiber 41 and the emission-side optical fiber 42, and a base material 45 on which the incidence-side optical fiber 41 and the emission-side optical fiber 42 are placed.

The connection protecting portion 44 is provided and located on the outer peripheral surfaces of a clad portion 41b and a clad portion 42b so as to straddle a connection point C6. The connection protecting portion 44 includes a first protective material 44a formed of a thermally conductive protective material, and a second protecting material 44b formed of a photorefractive protective material containing ultraviolet curable resin, which are provided in this order from the emission side to the incidence side for the laser light (a direction of an arrow B). A material having a refractive index equal to or higher than those of the clad portion 41b or the clad portion 42b may be used as a photorefractive protective material. Specifically, it is preferable to use Norland 61 manufactured by Norland USA or Desolite® made by JSR Corporation. The photorefractive protective material remarkably brings about an effect of suppressing increase of the temperature in the vicinity of the connection site 43 while gradually releasing light propagating through the clad portion 41b or the clad portion 42b when light is more likely to transmit through the photorefractive protective material as compared with the thermally conductive protective material.

[2-2. Method of Manufacturing Optical Module]

Next, a method of manufacturing the optical module 14 will be described with reference to FIG. 4.

After the incidence-side optical fiber 41 and the emission-side optical fiber 42 are fused and spliced to each other, as shown in FIG. 4, the cover of the cover portion 41c is further removed from the connection point C6 in the reverse direction (the direction of the arrow B) of the laser light, and the lengths of the removed covers are set to L3 (for example, about 2 cm) and L4 (for example, 4 cm). That is, in the example shown in FIG. 4, the length L1 of the removed cover in the emission-side optical fiber 42 is smaller than the length L3 of the removed cover in the incidence-side optical fiber 41 (L1<L3). Furthermore, the length L1 of the removed cover is smaller than the length L4 of the removed cover in the incidence-side optical fiber 41 (L1<L4). In addition, the length L3 of the removed cover in the incidence-side optical fiber 41 is smaller than the length L4 of the removed cover (L3<L4).

Then, the thermally conductive protective material (the first protective material 44a) and the photorefractive protective material (the second protective material 44b) are coated in the vicinity of the connection point C6 on the outer peripheral surfaces of the exposed clad portion 41b and clad portion 42b, thereby providing the connection protecting portion 44 for covering the connection site 43. Specifically, the thermally conductive protective material is coated on a part of the emission-side optical fiber 42 containing the lengths L3 and L1 of the removed covers, and the photorefractive protective material is coated on a part of the incidence-side optical fiber 41 containing the length L4 of the removed cover. Finally, the base material 45 is fitted so as to sandwich the connection site 43 by the base material 45, so that the optical module 14 is completed.

As described above, in the optical module 214 according to the above-described second embodiment, the connection site 43 is enclosed and covered by the connection protecting portion 44 formed of the thermally conductive protective material and the photorefractive protective material, whereby remaining leakage light can be promptly released to the outside of the clad portion 41b and the clad portion 42b while preferentially suppressing increase of the temperature in the vicinity of the connection site 43 caused by leakage light in the reverse direction (the direction of the arrow B).

3. Third Embodiment

Next, an optical module according to a third embodiment will be described with reference to FIG. 5. The third embodiment relates to an improvement of the configuration of the optical module 14 according to the first embodiment. The configurations of the other parts are similar to those of the first embodiment. Therefore, descriptions of the same configurations, etc. as the optical module 14 according to the first embodiment are omitted, and similar components to those of the optical module 14 according to the first embodiment will be described while represented by the same reference signs.

[3-1. Configuration of Optical Module]

Figure 5:
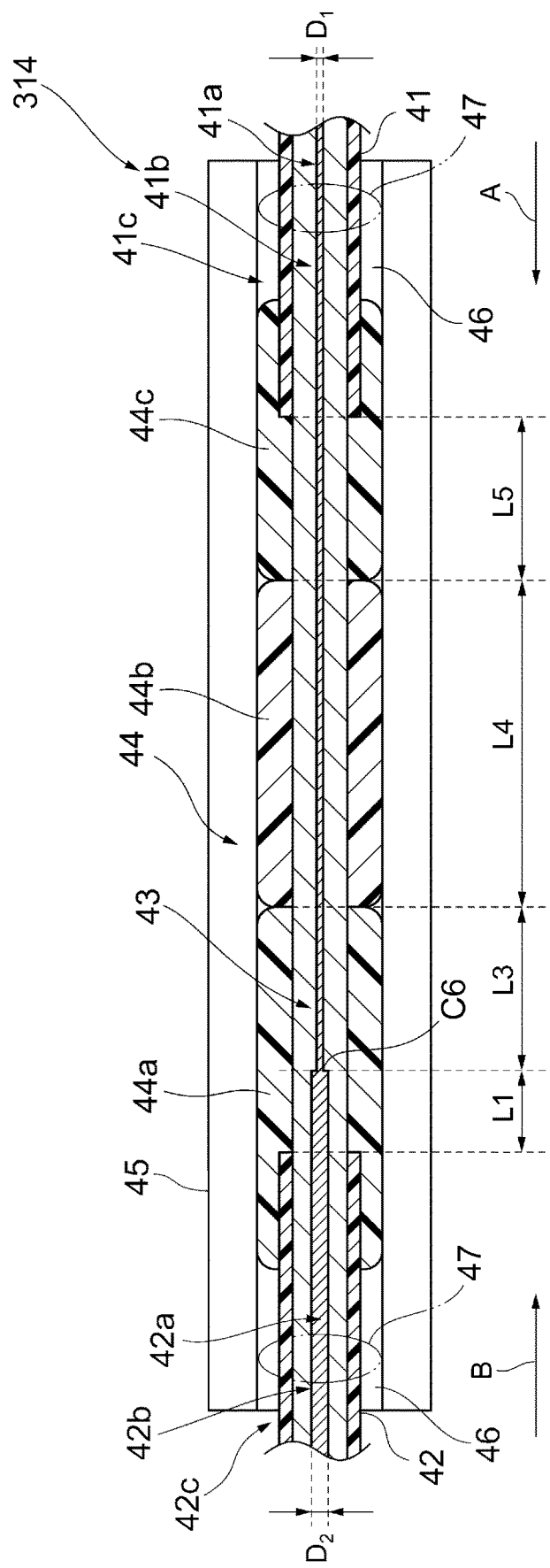
FIG. 5 is a cross-sectional view showing a configuration of an optical module according to a third embodiment.

As shown in FIG. 5, the optical module 314 includes an incidence-side optical fiber (first optical fiber) 41 corresponding to the incidence side for laser light, an emission-side optical fiber (second optical fiber) 42 corresponding to the emission side for a laser light, a connection protecting portion 44 that is provided and located so as to cover a connection site 43 for optically connecting the incidence-side optical fiber 41 and the emission-side optical fiber 42, and a base material 45 on which the incidence-side optical fiber 41 and the emission-side optical fiber 42 are placed.

The connection protecting portion 44 is provided and located on the outer peripheral surface of the clad portion 41b and the clad portion 42b so as to straddle the connection point C6. The connection protecting portion 44 includes a first protective material 44a formed of a thermally conductive protective material, a second protective material 44b formed of a photorefractive protective material, and a third protective material 44c formed of a thermally conductive protective material, which are provided in this order from the emission side for the laser light to the incidence side for the laser light (the direction of the arrow B).

[3-2. Method of Manufacturing Optical Module]

Next, a method of manufacturing the optical module 14 will be described with reference to FIG. 5.

After the incidence-side optical fiber 41 and the emission-side optical fiber 42 are fused and spliced to each other, as shown in FIG. 5, the cover of the cover portion 41c is further removed from the connection point C6 in the reverse direction of the laser light (the direction of the arrow B), and the lengths of the removed covers are set to L3 (for example, about 2 cm), L4 (for example, about 4 cm), and L5 (for example, about 2 cm). That is, in the example shown in FIG. 5, the length L1 of the removed cover in the emission-side optical fiber 42 is shorter than the lengths L3, L4, and L5 of the removed covers in the incidence-side optical fiber 41 (L1<L3, L1<L4, L1<L5). The length L3 of the removed cover is approximately equal to L5 (L3≈L5). L4 is larger than L5 (L4>L5).

As described above, in the optical module 314 according to the above-described third embodiment, the connection site 43 is enclosed and covered by the two thermally conductive protective materials (the first protective material 44a and the third protective material 44c) and the photorefractive protective material (the second protective material 44b) located between the two thermally conductive protective materials, whereby it is possible to preferentially suppress increase of the temperature in the vicinity of the connection site 43 and promptly release remaining leakage light in the reverse direction to the outside of the clad portion 41b and the clad portion 42b.

Furthermore, when leakage light in the reverse direction still remains, the increase of the temperature in the vicinity of the photorefractive protective material can be suppressed while gradually releasing the leakage light to the outside of the clad portion 41b and the clad portion 42b by the thermally conductive protective material (third protective material).

[3-3. Confirmation of Effect]

Next, measurement results of the highest temperature, etc. of the connection site 43 when return of laser light occurs will be described with reference to FIG. 5.

In the measurement of the connection site 43, the clad removal rate was measured as in the case of the first embodiment. The refractive index of each of the clad portions 41b and 42b is equal to 1.468, and the refractive index of each of the cover portions 41c and 42c is equal to 1.376. In addition, with respect to the thermally conductive protective material (T644) constituting the connection protecting portion 44, the refractive index of boron nitride as a filler is equal to 2.14, and the refractive index of the photorefractive protective material (Norland 61) is equal to 1.545 at a wavelength of 1070 nm/a temperature of 25° C.

As shown in FIG. 5, after the incidence-side optical fiber 41 and the emission-side optical fiber 42 are fused and spliced to each other, the cover of the cover portion 41c is further removed from the emission side for the laser light (the side of the arrow B) to the incidence-side for the laser light (the side of the arrow A), and the lengths of the removed covers are set to L3 (for example, about 2 cm), L4 (for example, about 4 cm) and L5 (for example, around 2 cm).

When the connection site 43 containing the exposed clad portion 41b and clad portion 42b is coated with the thermally conductive protective material, the photorefractive protective material and the thermally conductive protective material in this order from the emission-side for the laser light (the side of the arrow B) to the incidence-side for the laser light (the side of the arrow A), the highest temperature of the portion coated with the photorefractive protective material (the second protective material 44b) was measured to be about 66° C., and the clad removal rate was measured to be about 93%.

Furthermore, when the lengths of the removed covers were set to L3 (for example, about 2 cm), L4 (for example, about 4 cm), and L5 (for example, about 2 cm) and the radius R at a bending position when the incidence-side optical fiber 41 was bent was set to about 8 cm, the highest temperature of a portion coated with the photorefractive protective material was measured to be about 53° C., and the clad removal rate was measured to be about 98%.

When the length of L4 was set to about 8 cm and the connection site 43 containing the exposed clad portion 41b and clad portion 42b was coated with the thermally conductive protective material and the photorefractive protective material, the clad removal rate was measured to be about 100%.

Therefore, it is preferable that after the incidence-side optical fiber 41 and the emission-side optical fiber 42 are fused and spliced to each other, the cover of the cover portion 41c is further removed, the lengths of the removed covers are set to L3 (2 cm), L4 (from 4 cm to 8 cm) and L5 (2 cm), and the connection site 43 containing the exposed clad portion 41b and clad portion 42b are coated with the thermally conductive protective material and the photorefractive protective material.

4. Action and Effect

The optical modules 14, 214, and 314 as described above have the incidence-side optical fiber 41 corresponding to the incidence side for the laser light, the emission-side optical fiber 42 corresponding to the emission side for the laser light, and the connection protecting portion 44 provided and located so as to cover the connection site 43 for optically connecting the incidence-side optical fiber 41 and the emission-side optical fiber 42. The emission-side optical fiber 42 has a larger core diameter (core diameter D1<core diameter D2) than the incidence-side optical fiber 41, the connection site 43 is a site where the core portions 41a and 42a of the incidence-side optical fiber 41 and the emission-side optical fiber 42 are connected to each other in a discontinuous shape, and the connection protecting portion 44 is formed of the thermally conductive protective material and/or the photorefractive protective material having a relatively high refractive index as compared with the clad portion 41b of the incidence-side optical fiber.

According to the optical module 14 described above, since the incidence-side optical fiber 41 having a relatively small core diameter is provided on the incidence side of the laser light while the emission-side optical fiber 42 having a relatively large core diameter is provided on the emission side for the laser light, the laser light can be caused to propagate in the forward direction without leakage through even the connection site where the core portion 41a and the core portion 42a are simply connected to each other in a discontinuous shape.

Furthermore, the connection site 43 is enclosed and covered by the thermally conductive protective material, whereby increase of the temperature in vicinity of the connection site 43 can be suppressed while gradually releasing leakage light in the reverse direction of laser light (the return direction; the direction of the arrow B) to the outside of the clad portion 41b and the clad portion 42b. In combination with or independently of this, the connection site 43 is covered by the photorefractive protective material having a relatively higher refractive index than the clad portion 41b of the incidence-side optical fiber 41, whereby leakage light in the reverse direction can be promptly released to the outside of the clad portion 41b and the cladding portion 42b. Accordingly, with respect to the connection between the optical fibers 41 and 42 having different core diameters D1 and D2, it is possible to provide an optical module 14 capable of making both reduction of the number of working steps and reduction of the manufacturing cost compatible with each other.

Furthermore, the connection protecting portion 44 of the optical module 214 is provided on the outer peripheral surfaces of the clad portion 41b and the clad portion 42b, and includes the first protective material 44a formed of the thermally conductive protective material, and the second protective material 44b formed of the photorefractive protective material, which are provided in this order from the emission side for the laser light to the incidence side for the laser light. As a result, it is possible to preferentially suppress increase of the temperature in the vicinity of the connection site 43, and also it is possible to promptly release remaining leakage light in the reverse direction (the return direction; the direction of the arrow B) to the outside of the clad portion 41b and the clad portion 42b.

Furthermore, the connection protecting portion 44 of the optical module 314 is provided on the outer peripheral surfaces of the clad portion 41b and the clad portion 42b, and includes the first protective material 44a formed of the thermally conductive protective material, the second protective material 44b formed of the photorefractive protective material, and the third protective material 44c formed of the thermally conductive protective material, which are provided in this order from the emission side for the laser light to the incidence side for the laser light. As a result, it is possible to preferentially suppress increase of the temperature in the vicinity of the connection site 43, and also it is possible to promptly release remaining leakage light in the reverse direction (the return direction; the direction of the arrow B) to the outside of the clad portion 41b and the clad portion 42b. When the leakage light in the reverse direction remains, the increase of the temperature in the vicinity of the photorefractive protective material (the second protective material) can be suppressed while gradually releasing this leakage light to the outside of the clad portion 41b and the clad portion 42b.

Since the output unit 16 for condensing emitted laser light and outputting the condensed laser light to the outside is connected to the emission-side optical fiber 42 of the optical module 14, 214, 314, the light amount of return light tends to change according to the condensed state of the laser light. Therefore, the output unit 16 for condensing laser light and outputting the condensed laser light to the outside is connected to the emission-side optical fiber 42, thereby accentuating the effect of suppressing increase of the temperature in the vicinity of the connection site 43 while gradually releasing leakage light in the reverse direction (the return direction; the direction of the arrow B) to the outside of the clad portion 41b and the clad portion 42b. In combination with or independently of this, the connection site 43 is covered by the photorefractive protective material having a relatively higher refractive index than the clad portion 41b of the incidence-side optical fiber 41, thereby accentuating the effect of enabling leakage light in the reverse direction to be promptly released to the outside of the clad portion 41b.

In the light output device 1 as described above, since the output unit 16 for condensing emitted laser light and outputting the emitted laser light to the outside is connected to the emission-side optical fiber 42, the light amount of the return light tends to change according to the condensed state of the laser light. By connecting the output unit 16 for condensing laser light and outputting the condensed laser light to the outside to the emission-side optical fiber 42, the increase of the temperature in the vicinity of the connection site 43 can be suppressed while gradually releasing leakage light in the reverse direction (the return direction; the direction of the arrow B) to the outside of the clad portion 41b and the clad portion 42b. In combination with or independently of this, the connection site 43 is covered by the photorefractive protective material having a relatively higher refractive index than the clad portion 41b of the incidence-side optical fiber 41, whereby the leakage light in the reverse direction can be promptly released to the outside of the clad portion 41b. Accordingly, with respect to the connection between the optical fibers 41 and 42 having different core diameters D1 and D2, it is possible to provide the light output device 1 capable of making both reduction of the number of working steps and reduction of the manufacturing cost compatible with each other.

5. Other Embodiments and Variants

The optical modules 14, 214, 314 and the light output device 1 according to the present embodiments have been illustrated and described based on the embodiments, but the optical modules 14, 214, 314 and the light output device 1 are not limited to the foregoing ones. The configuration of each part can be replaced with an arbitrary configuration having a similar function. Hereinafter, the optical modules 14, 214, 314 and the light output device 1 according to other embodiments and variants of the optical modules 14, 214, 314 and the light output device 1 will be described.

5-1. Another Embodiment 1

Figure 6:
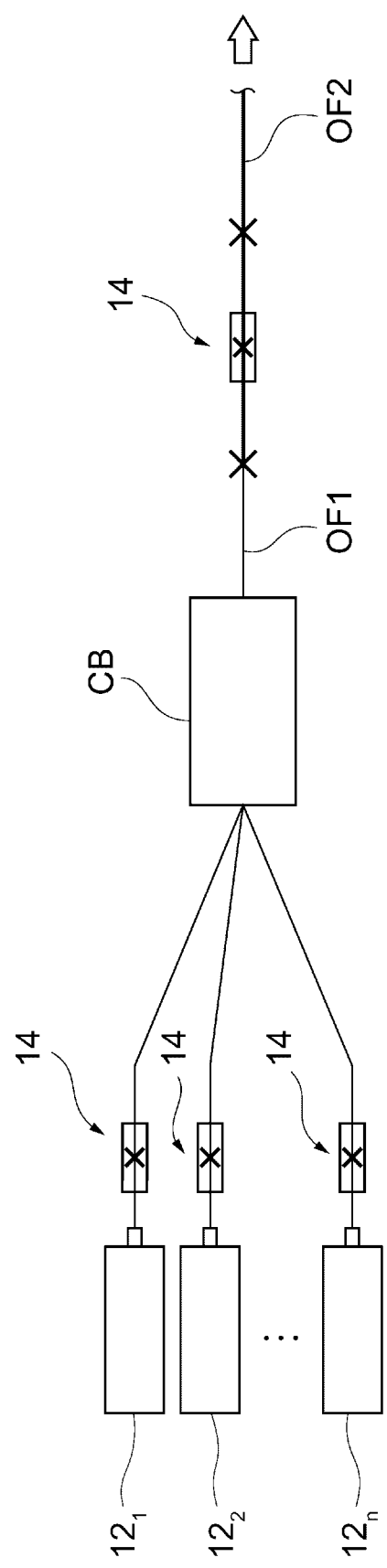
FIG. 6 is a plan view showing a light output device according to another embodiment.

The optical modules 14, 214, 314 according to the foregoing present embodiments has been described by exemplifying the case where laser light is incident from the light source unit 12 shown in FIG. 1. However, as shown in FIG. 6, the above-described embodiments may be configured so that a plurality of light source units $12_1$ to $12_n$ shown in FIG. 1 are connected to one another so as to make laser light incident. Specifically, the plurality of light source units $12_1$ to $12_n$ are connected to a combiner CB by the optical module 14 described above, and a cable OF1 connected to the combiner CB and a cable OF2 connected to an output device or the like (not shown) are connected to each other by the optical module 14.

In the above-described embodiments, the description has been made by illustrating the case where the light source unit 12 and the optical modules 14, 214, 314 are configured as separate bodies. However, the optical modules 14, 214, 314 may be used inside the light source unit 12.

Here, the laser light to be incident on the optical modules 14, 214, and 314 described above may be laser light from a single mode fiber laser or laser light from a multimode fiber laser. When the multimode fiber laser is used, laser light may be further multiplexed by a multiplexer. Laser light may be incident from a plurality of multimode fiber lasers. Furthermore, laser light may be incident from a DDL (Direct Diode Laser).

Furthermore, not only the optical modules 14, 214, 314 may be respectively connected in parallel as shown in FIG. 6, but also the optical modules 14, 214, 314 may be connected in series. In this case, plural types of optical modules may be connected in series.

5-2. Another Embodiment 2

With respect to the optical module 214 according to the present embodiment described above, it is shown in FIG. 4 that the boundary portion between the first protective material 44a and the second protective material 44b in the connection protecting portion 44 is formed in such a shape that the vertical surfaces at the boundary portion are made to butt against each other. However, as shown in FIGS. 7A and 7B, boundary portions 74a, 74b between the first protective material 44a and the second protective material 44b may be formed in various shapes different from that of the boundary portion shown in FIG. 4, and the shape of the boundary portion is not limited to specific ones.

For example, the boundary portion may be shaped so that an end portion of the second protective material 44b covers an end of the first protective material 44a in cross-sectional view as in the case of the boundary portion 74a shown in FIG. 7A. The boundary portion 74a may be shaped so that the end portion of the first protective material 44a covers the end portion of the second protective material 44b.

Furthermore, the boundary portion may be shaped so that the end portion of the first protective material 44a is curved so as to protrude to the side of the second protective material 44b in cross-sectional view as in the case of the boundary portion 74b shown in FIG. 7B. The boundary portion 74b may be shaped so that the end portion of the first protective material 44a is curved in the opposite direction, that is, the end portion of the second protective material 44b is curved so as to protrude to the side of the first protective material 44a.

Not only the shape of the boundary portion between the first protective material 44a and the second protective material 44b, but also the shape of the boundary portion between the second protective material 44b and the third protective material 44c shown in FIG. 5 may be like the shapes of the boundary portions 74a and 74b shown in FIGS. 7A and 7B.

Furthermore, the boundary portion between the first protective material 44a and the second protective material 44b and the boundary portion between the second protective material 44b and the third protective material 44c may be shaped like the boundary portions 74a and 74b shown in FIGS. 7A and 7B, but may be shaped so that the boundary portion has a complicatedly entangled shape, and the first protective material 44a and the second protective material 44b are intermixed with each other at the boundary portion.

5-3. Variant

With respect to the optical module 14 according to the present embodiment described above, it has been described with reference to FIGS. 2A and 2B that the covers of L1 and L2 (L3) are removed, and the thermally conductive protective material is coated in the vicinity of the connection point C on the outer peripheral surfaces of the exposed clad portion 41b and clad portion 42b. Instead of the thermally conductive protective material, the photorefractive protective material may be coated. In this case, the leakage light in the reverse direction (the return direction; the direction of the arrow B) can be promptly released to the outside of the clad portion.

The optical modules 14, 214, and 314 according to the present embodiments have been described by illustrating the case where the core portion 41a of the incidence-side optical fiber 41 and the core portion 42a of the emission-side optical fiber 42 are connected to each other in a stepped shape vertical to the axial direction at the connection point C6 as an example in which the core portion 41a of the incidence-side optical fiber 41 and the core portion 42a of the emission-side optical fiber 42 are connected to each other in a discontinuous shape. However, the core portion 41a of the incidence-side optical fiber 41 and the core portion 42a of the emission-side optical fiber 42 may be connected to each other with a gentle step with respect to the axial direction.

Furthermore, the above-described optical modules 14, 214, and 314 according to the present embodiments have been described by exemplifying the case where each of the clad diameter and the cover diameter is the same between the incidence-side optical fiber 41 and the emission-side optical fiber 42. However, the incidence-side optical fiber 41 and the emission-side optical fiber 42 which are different in at least one of the clad diameter and the cover diameter may be used.

The description has been made regarding the case where the output unit 16 is connected via the connection cable 17 to the emission-side optical fibers 42 of the optical modules 14, 214, 314 according to the present embodiments described above. However, the output unit 16 may be connected via an output fiber. Furthermore, the description has been made of the case where the output unit 16 is an optical device for cutting a workpiece W. However, the optical device may be changed to another device.

Furthermore, the emission-side optical fibers 42 of the optical modules 14, 214, and 314 may be connected to an output cable or an output fiber in addition to the output unit 16 for condensing laser light and outputting the condensed laser light to the outside.

As described above, the same action and effect as those of the optical modules 14, 214, 314 and the light output device 1 according to the embodiments of the present disclosure can be obtained even by replacing them with any configuration having the same function.

What is claimed is:
1. An optical module comprising:
 a first optical fiber corresponding to an incidence side for laser light;
 a second optical fiber corresponding to an emission side for the laser light;
 a connection protecting portion that is provided and located so as to cover a connection site for optically connecting the first optical fiber and the second optical fiber; and
 a base material formed of metal accommodating the connection protecting portion, the first optical fiber and the second optical fiber,
 wherein
 the second optical fiber has a larger core diameter than the first optical fiber, the connection site is a site where a core portion of the first optical fiber and a core portion of the second optical fiber are connected to each other in a discontinuous shape,
 the connection protecting portion includes a thermally conductive protective material, or the thermally conductive protective material and a photorefractive pro- tective material having a refractive index that is equal to or higher than that of a clad portion of the first optical fiber, the thermally conductive protective material is provided and located so as to straddle a connection point of the first optical fiber and the second optical fiber, and a transmittance per mm in thickness when laser light is applied vertically to the thermally conductive protective material ranges from not less than 1% to not more than 10%.

2. The optical module according to claim 1, wherein the connection protecting portion is provided on an outer peripheral surface of the clad portion, and includes a first protective material formed of the thermally conductive protective material, and a second protective material formed of the photorefractive protective material that are provided in this order from the emission side for the laser light to the incidence side for the laser light.

3. The optical module according to claim 1, wherein the connection protecting portion is provided on an outer peripheral surface of the clad portion and includes a first protective material formed of the thermally conductive protective material, a second protective material formed of the photorefractive protective material, and a third protective material formed of the thermally conductive protective material that are provided in this order from the emission side for the laser light to the incidence side for the laser light.

4. The optical module according to claim 1, wherein an output unit for condensing the emitted laser light and outputting the condensed laser light to the outside is optically connected to a side of the second optical fiber.

5. A light output device comprising:
the optical module according to claim 1;
a light source unit for making laser light incident on the optical module; and
an output unit for outputting the laser light emitted from the optical module to the outside.

6. The optical module according to claim 1, wherein the thermally conductive protective material includes a filler having a refractive index of 2.14.

7. An optical module comprising:
a first optical fiber corresponding to an incidence side for laser light;
a second optical fiber corresponding to an emission side for the laser light; and
a connection protecting portion that is provided and located so as to cover a connection site for optically connecting the first optical fiber and the second optical fiber, wherein the second optical fiber has a larger core diameter than the first optical fiber, the connection site is a site where a core portion of the first optical fiber and a core portion of the second optical fiber are connected to each other in a discontinuous shape, the connection protecting portion includes a thermally conductive protective material and/or a photorefractive protective material having a refractive index that is equal to or higher than that of a clad portion of the first optical fiber, and the connection protecting portion is provided on an outer peripheral surface of the clad portion, and includes a first protective material formed of the thermally conductive protective material, and a second protective material formed of the photorefractive protective material that are provided in this order from the emission side for the laser light to the incidence side for the laser light.

8. An optical module comprising:
a first optical fiber corresponding to an incidence side for laser light;
a second optical fiber corresponding to an emission side for the laser light; and
a connection protecting portion that is provided and located so as to cover a connection site for optically connecting the first optical fiber and the second optical fiber, wherein the second optical fiber has a larger core diameter than the first optical fiber, the connection site is a site where a core portion of the first optical fiber and a core portion of the second optical fiber are connected to each other in a discontinuous shape, and the connection protecting portion includes a thermally conductive protective material and/or a photorefractive protective material having a refractive index that is equal to or higher than that of a clad portion of the first optical fiber, and the connection protecting portion is provided on an outer peripheral surface of the clad portion and includes a first protective material formed of the thermally conductive protective material, a second protective material formed of the photorefractive protective material, and a third protective material formed of the thermally conductive protective material that are provided in this order from the emission side for the laser light to the incidence side for the laser light.

* * * * *